(12) United States Patent
Ahn

(10) Patent No.: US 8,167,473 B2
(45) Date of Patent: May 1, 2012

(54) BACKLIGHT UNIT

(75) Inventor: Sang Hyun Ahn, Paju-si (KR)

(73) Assignee: LG Display Co. Ltd., Seoul (KR)

( * ) Notice: Subject to any disclaimer, the term of this patent is extended or adjusted under 35 U.S.C. 154(b) by 67 days.

(21) Appl. No.: 12/486,466

(22) Filed: Jun. 17, 2009

(65) Prior Publication Data

US 2010/0124047 A1 May 20, 2010

(30) Foreign Application Priority Data

Nov. 14, 2008 (KR) ........................ 10-2008-0113668

(51) Int. Cl.
*F21V 21/00* (2006.01)
(52) U.S. Cl. ....... 362/606; 362/626; 362/97.3; 362/97.4
(58) Field of Classification Search .................. 362/606, 362/612, 613, 625, 626, 97.3, 97.4
See application file for complete search history.

(56) References Cited

U.S. PATENT DOCUMENTS 7,628,514 B2 * 12/2009 Hsu et al. ....................... 362/333
7,794,098 B2 * 9/2010 Chang ........................... 362/97.3

FOREIGN PATENT DOCUMENTS

TW 200528867 9/2005
TW 200736731 10/2007

OTHER PUBLICATIONS

Office Action issued in corresponding Chinese Patent Application No. 200910151194.4, mailed Mar. 23, 2011.

* cited by examiner

*Primary Examiner* — John A Ward
(74) *Attorney, Agent, or Firm* — Brinks Hofer Gilson & Lione

(57) ABSTRACT

A backlight unit capable of implementing slimness and preventing stain defects is disclosed. The backlight unit includes a plurality of LEDs arranged in a fixed interval, a reflection sheet disposed under the LEDs and configured to reflect light, a diffusion plate disposed on the LEDs and configured to diffuse light, and a plurality of inversed pyramid patterns formed along a diagonal direction in the center of one side of the diffusion plate on the upper surface of the diffusion plate. The plural LEDs include a plurality of odd-numbered line LEDs and a plurality of even-numbered line LEDs arranged in zigzags.

14 Claims, 4 Drawing Sheets

BACKLIGHT UNIT

RELATED APPLICATIONS

This application claims priority to Korean Patent Application No. 10-2008-0113668, filed on Nov. 14, 2008, which is hereby incorporated by reference in its entirety.

BACKGROUND

1. Field of the Disclosure

This disclosure relates to a backlight unit capable of implementing slimness and preventing a stain defect.

2. Description of the Related Art

It is the trend that liquid crystal display (LCD) devices are widening their application fields because of their features, such as their light weight, slimness, a low driving voltage, and so on. This trend is evidently confirmed in the ways in which the LCD devices have been applied to office automation equipment, audio equipment, video equipment, and so on. The LCD device controls a transmitting amount of light on the basis of image signals applied to a plurality of control switches, in order to display a picture.

The LCD device, which is not self-luminescent, includes a backlight unit irradiating light on the rear surface of an LCD panel in which a picture is displayed. The backlight unit is classified as either an edge type or a direct type in accordance with the disposition of its light source.

The edge type backlight unit includes a light source which is disposed in a position corresponding to a side of the LCD panel. Also, the edge type backlight unit irradiates light emitted from the light source on the entire surface of the LCD panel using a light guide panel. On the other hand, the direct type backlight unit includes a plurality of light sources arranged opposite the rear surface of the LCD panel. These plural light sources directly apply light to the rear surface of the LCD panel. The direct type backlight unit has a higher brightness and a wider luminescent surface than that of the edge type backlight unit because it employs plural light sources. In addition, the backlight unit becomes larger in size corresponding to the increased size of the LCD device. In view of these points, direct type backlight units are widely used in LCD devices.

Such a direct type backlight unit generates a brightness difference between regions which include a light source and those which do not. This results from the configuration in which plural light sources are arranged at fixed intervals on the rear surface of the LCD panel. To rectify this, a direct type backlight unit of the related art included in an LCD device increases the distance (or gap) between the light sources and a diffusion plate disposed above the light sources. Accordingly, the direct type backlight unit of the related art can prevent the brightness difference between regions which include a light source and those which do not. In other words, the direct type backlight unit of the related art can realize uniform brightness.

However, the direct type backlight unit used in a large-sized LCD device must maintain a sufficient distance (or gap) between the light sources and the diffusion plate in order to realize uniform brightness. Therefore, the direct type backlight unit of the related art makes it difficult to develop an LCD device of a size thin enough to meet the desires of customers.

Furthermore, light emission diodes (LED) recently used in backlight units as a light source greatly intensify the brightness difference between the regions in which they are disposed and those in which they are not. Due to this, stain defects are generated on an image displayed by the LCD device which employs the direct type backlight unit with LEDs.

BRIEF SUMMARY

Accordingly, the present embodiments are directed to a backlight unit that substantially obviates one or more of problems due to the limitations and disadvantages of the related art.

An object of the present embodiment is to provide a backlight unit capable of implementing slimness and preventing stain defects.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to a general aspect of an embodiment of the present disclosure, a backlight unit may include: a plurality of LEDs arranged in a fixed interval; a reflection sheet disposed under the LEDs and configured to reflect light; a diffusion plate disposed on the LEDs and configured to diffuse light; and a plurality of inversed pyramid patterns formed in intaglio on the upper surface of the diffusion plate, wherein the plurality of inversed pyramid patterns are arranged along lines parallel to an inclined line inclined at an angle greater than 0° with respect to a side of the diffusion plate, and wherein the plurality of LEDs include a plurality of odd-numbered line LEDs and two adjacent LEDs in odd-numbered lines constitute a parallelogram with corresponding two adjacent LEDs in even-numbered lines.

Furthermore, one side surface of the inversed pyramid pattern may be inclined at an angle of about 45° with respect to the side surface of the diffusion plate.

Further, the diffusion plate may be formed of a mixture which contains one resin material of Cyclo Olefin Polymer (COP) and Cyclo Olefin Co-polymer (COC) and dispersing particles.

Still Further, a bottom portion of the inversed pyramid pattern may be cut to be formed in a planar structure, and wherein the bottom portion is opposite to the upper surface of the diffusion plate.

Still Furthermore, a width of the top portion of the inversed pyramid pattern may be in a range of about 50 to 100 μm, and the top portion is on the upper surface of the diffusion plate.

Further, an intaglio depth of the inversed pyramid pattern may be in a range of about 20 to 50 μm.

Still further, a pitch between centers of two adjacent inversed pyramid patterns may be in a range of about 50 to 100 μm.

Further, a distance between the inversed pyramid patterns adjacent to each other may be below 10 μm.

Still further, the diffusion plate may be in a thickness range of about 1 to 2 mm.

Further, a distance between a rear surface of the diffusion plate and a upper surface of the reflection sheet may be in a range of about 3 to 8 mm.

Still further, a distance between the adjacent odd-numbered line LEDs of the same line may be below about 34 mm.

Further, a distance between the adjacent even-numbered line LEDs of the same line may be below about 34 mm.

Still further, a distance between the adjacent odd-numbered line LEDs on different lines may be below about 40 mm.

Further, a distance between the adjacent even-numbered line LEDs on different lines may be below about 40 mm.

It should be understood that various changes or modifications or recombinations thereof are possible to the ordinary skilled person in the art, without departing from the spirit of the present disclosure.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION OF THE DRAWINGS AND THE PRESENTLY PREFERRED EMBODIMENTS

Figure 1:
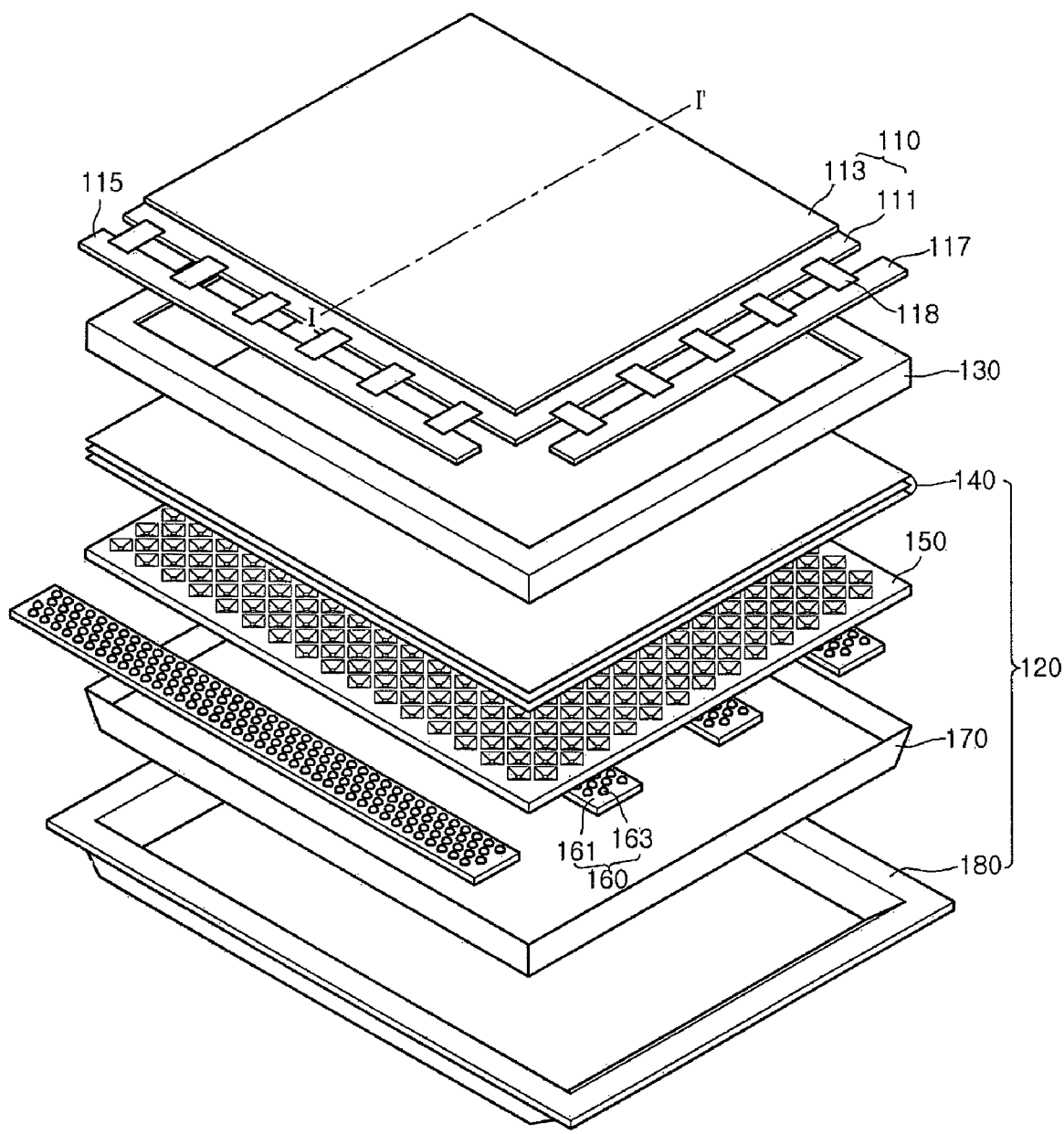
FIG. 1 is an exploded perspective view showing a direct type LCD device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
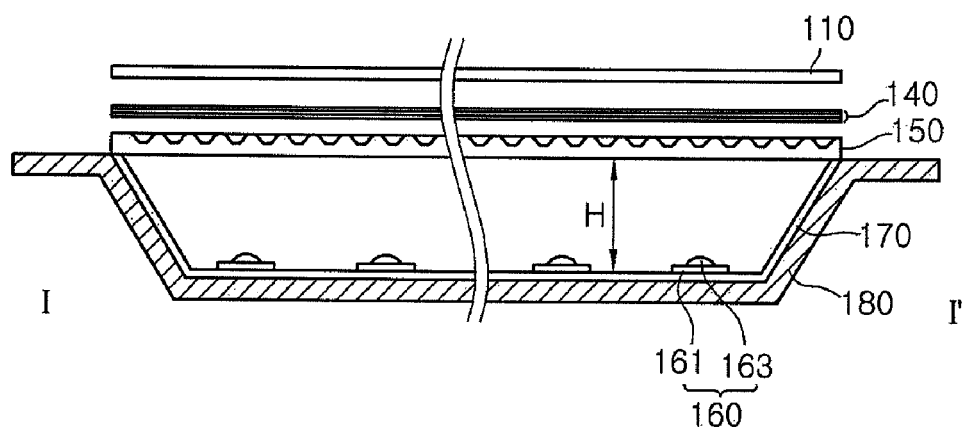
FIG. 2 is a cross-sectional view showing a direct type LCD device taken along line I-I' of FIG. 1.

FIG. 1 is an exploded perspective view showing a direct type LCD device according to an embodiment of the present disclosure. FIG. 2 is a cross-sectional view showing a direct type LCD device taken along line I-I' of FIG. 1. Referring to FIGS. 1 and 2, a direct type LCD device according to an embodiment of the present disclosure includes an LCD panel 110 configured to display an image, and a backlight unit 120 disposed to irradiate light on the rear surface the LCD panel 110.

The LCD panel 110 includes a thin film transistor substrate 111 and a color filter substrate 113 disposed opposite each other and combined to maintain a cell gap between them, as well as a liquid crystal layer interposed between the substrates 111 and 113. The thin film transistor substrate 111 includes a plurality of gate lines, a plurality of data lines, and a plurality of transistors. The gate lines and the data lines cross each other and define pixels. Each of the transistors is disposed at the intersection of a gate line and a data line. The color filter substrate 113 includes a plurality of color filters and a black matrix. Each of the color filters is formed on the respective pixel. The black matrix is formed on the edges of the color filters opposite to the gate lines, the data lines, and the thin film transistors.

The LCD device also includes a data drive unit 115 disposed on one side of the LCD panel 110 and a gate drive unit 117 disposed on the other side of the LCD panel 110. The data drive unit 115 applies data signals to the data lines on the LCD panel 110. The gate drive unit 117 sequentially applies a scan signal to the gate lines on the LCD panel 110 and forces the thin film transistors connected to the respective gate lines to be turned on (or activated), in one horizontal period. Such data and gate drive units 115 and 117 are mounted on printed circuit boards (PCBs). Also, the data and gate drive units 115 and 117 are electrically connected to the LCD panel 110 by means of tape carrier packages (TCPs) 118.

A panel guide 130 supporting the LCD panel 110 is disposed on the edge of the rear surface of the LCD panel 110. The panel guide 130 is combined with the backlight unit 120.

Sequentially, a backlight unit according to an embodiment of the present disclosure will now be explained as a direct type which can be applied to a large-sized LCD device of at least 20 inches.

The backlight unit 120 includes a bottom cover 180 with an opened upper surface, a plurality of light source units 160 arranged at fixed intervals on the bottom cover 180, a diffusion plate 150 disposed on the plural light source units 160, optical sheets 140 disposed on the diffusion plate 150, and a reflection sheet 170 disposed under the plural light source units 160. The diffusion plate 150 diffuses light. The optical sheets 140 force light to be diffused and converged. The reflection sheet 170 reflects light progressing downward from the light source units 160 toward the LCD panel 110.

Each of the plural light source units 160 includes a printed circuit board (PCB) 161 and a plurality of LEDs 163 mounted at fixed intervals on the PCB 161. The PCB 161 includes a conductive pattern receiving a light source drive signal from the exterior. The LEDs 163 are arranged to form a triangular structure. However, the arrangement configuration of the LEDs 163 according the present embodiment is not limited to this. Actually, the LEDs 163 can be arranged in a variety of configurations including a quad configuration in which the LEDs are arranged in groups of four.

The diffusion plate 150 diffuses light emitted from the LED 163. To this end, the diffusion plate 150 includes a plurality of inverted pyramid patterns formed on it.

The diffusion plate 150 is formed of a resin material such as cyclo olefin polymer (COP) or cyclo olefin co-polymer (COC). As COP and COC have superior heat-resistant and moisture-resistant characteristics as well as superior transparent and electric properties, it is very hard to change the diffusion plate 150 formed of COP or COC using heat. Also, since COP and COC flow very well in a molten state, the diffusion plate 150 formed of COP or COC is easy to form accurately. Furthermore, the diffusion plate 150 formed of COP or COC can greatly reduce the total weight of the backlight unit 120 or the LCD device because COP and COC each have an entire density lower than that of general (commercial or other) resins by at least 15%. In addition, the diffusion plate 150 formed of COP or COC is hard to break or crack in comparison with general acrylic resins because COP and COC have superior hardness.

In other words, the diffusion plate 150 of COP or COC is provided with several features such as easy formation of accurate patterns, light weight, and high degree of hardness. Accordingly, the backlight unit and the LCD device of the present embodiments can improve stain defects and can be thinner. In addition, the diffusion plate 150 can be mass-produced since it is formed in a single layer structure.

Inversed pyramid patterns are formed in intaglio on the upper surface of the diffusion plate 150. These inversed pyramid patterns are arranged in a configuration capable of preventing the stain defects which occur due to the use of LEDs 163 as light sources in the backlight unit 120. More specifically, the inversed pyramid patterns are arranged along lines parallel to an inclined line inclined at a certain angle greater than 0° with respect to a side of the diffusion plate 150. Preferably, the inversed pyramid patterns can be formed along a direction inclined at an angle of 45° in the center of one side portion of the diffusion plate 150.

The diffusion plate 150 is separated from the upper surface of the reflection sheet 170 by a distance of between 3 to 8 mm. In other words, the distance between the rear surface of the diffusion plate 150 and the upper surface of the reflection sheet 170 is in a range of 3 to 8 mm. As such, the LCD device can have a structure slim enough to implement the slimness of the backlight unit 120 of the present embodiment as well.

In the backlight unit 120 of the above configuration, light emitted from the LEDs 163 is primarily diffused by the inversed pyramid pattern of the diffusion plate 150. The primarily diffused light is secondarily-diffused and converged by means of the optical sheets 140 before being irradiated on the LCD panel 110. More specifically, the primarily diffused light from the diffusion plate 150 is re-processed by a prism sheet of the optical sheets 140. Accordingly, the LCD device can further prevent the generation of stain phenomenon.

Such a diffusion plate 150 with inversed pyramid patterns, which are formed in intaglio and arranged along a diagonal direction in the center of one of its side portion, is included in the LCD device of an embodiment of the present disclosure. Therefore, the LCD device employing LEDs 163 as its light source can prevent stain defects. More specifically, the LCD device according to an embodiment of the present disclosure employing the backlight unit with the diffusion plate of the inversed pyramid intaglio patterns improves at least about 80% in stain defects visible to ordinary sight and at least about 7% in brightness in comparison with that including the related art backlight unit.

The diffusion plate 150 of the present embodiment can be formed of a mixture which contains one resin material of COP (Cyclo Olefin Polymer) and COC (Cyclo Olefin Co-polymer) and an appropriate ratio of dispersing particles. In this way, the diffusion plate 150 may further improve its mass-productivity and slimness in comparison with the related art diffusion plate.

Figure 3:
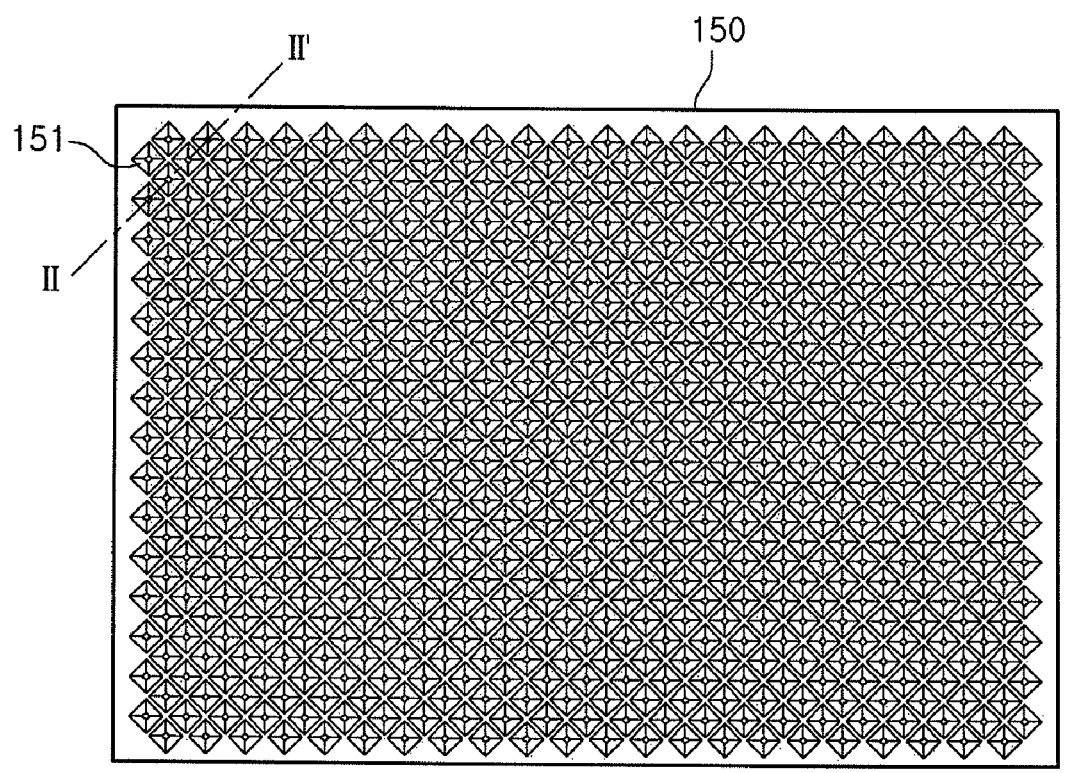
FIG. 3 is a plane view showing a diffusion plate in FIG. 1.
Figure 4:
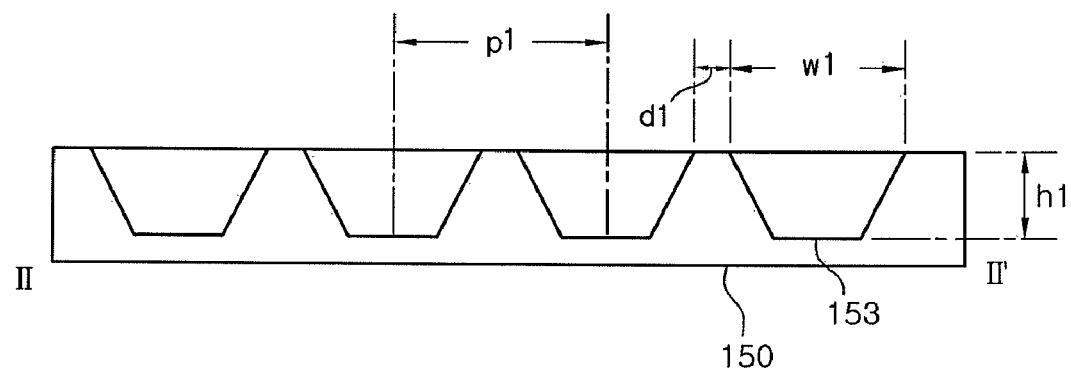
FIG. 4 is a cross-sectional view showing a diffusion plate taken along the line II-II' of FIG. 3.

FIG. 3 is a plane view showing the diffusion plate in FIG. 1. FIG. 4 is a cross-sectional view showing the diffusion plate taken along II-II' of FIG. 3. The diffusion plate according to an embodiment of the present disclosure includes a plurality of inversed pyramid patterns 151 which are arranged along lines parallel to a inclined line inclined at a certain angle greater than 0° with respect to a side of the diffusion plate 150, as shown in FIG. 3. The diffusion plate 150 is in a thickness range of about 1 to 2 mm.

The side surfaces of the inversed pyramid patterns 151 progress downward from the upper surface of the diffusion plate 150 in a direction inclined at an angle of 45° from its side surface. As such, the inversed pyramid patterns 151 are formed on the upper surface of the diffusion plate 150 in an intaglio structure of a concave shape. In other words, the inversed pyramid patterns 151 each have a structure which is inwardly narrowed in width. In addition, the inversed pyramid patterns 151 each have a bottom portion formed in a planar structure. Accordingly, the bottom portion of the inversed pyramid pattern 150 will be referred to a planar surface 153.

The width w1 of the inversed pyramid pattern 151 is in a range of about 50 to 100 μm, and the intaglio depth h1 of the inversed pyramid pattern 151 is in a range of about 20 to 50 μm. Also, the pitch p1 between the inversed pyramid patterns 151 has a range of about 50 to 100 μm. Furthermore, the distance d1 between the inversed pyramid patterns 151 adjacent to each other is below 10 μm.

Figure 5:
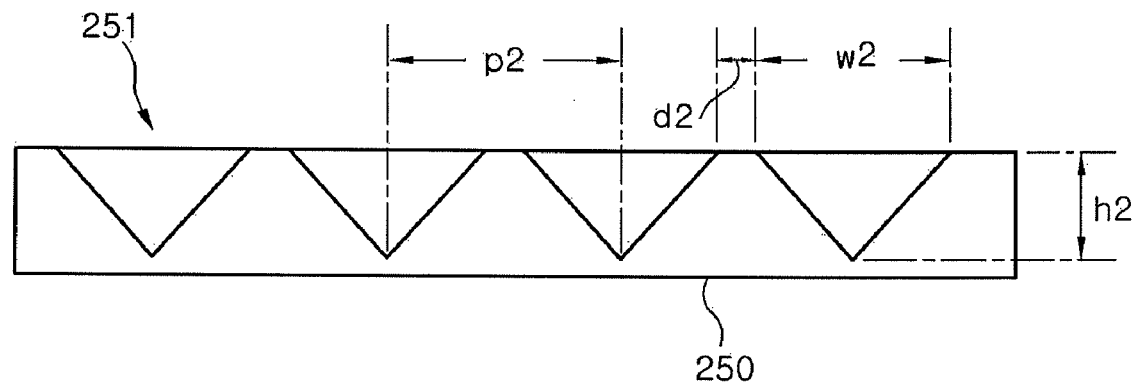
FIG. 5 is a cross-sectional view showing a diffusion plate according to another embodiment of the present disclosure.

FIG. 5 is a cross-sectional view showing a diffusion plate according to another embodiment of the present disclosure. As shown in FIG. 5, a diffusion plate 250 according to another embodiment of the present disclosure includes a plurality of inversed pyramid patterns 251 formed in an intaglio structure. The bottom portion of the inversed pyramid pattern 251 is formed in an inverse apex structure.

The width w2 of the inversed pyramid pattern 251 is in a range of about 50 to 100 μm, and the intaglio depth h2 of the inversed pyramid pattern 251 is in a range of about 20 to 50 μm. Also, the pitch p2 of the inversed pyramid pattern 251 has a range of about 50 to 100 μm. Furthermore, the distance d2 between the inversed pyramid patterns 251 adjacent to each other is below 10 μm.

Figure 6:
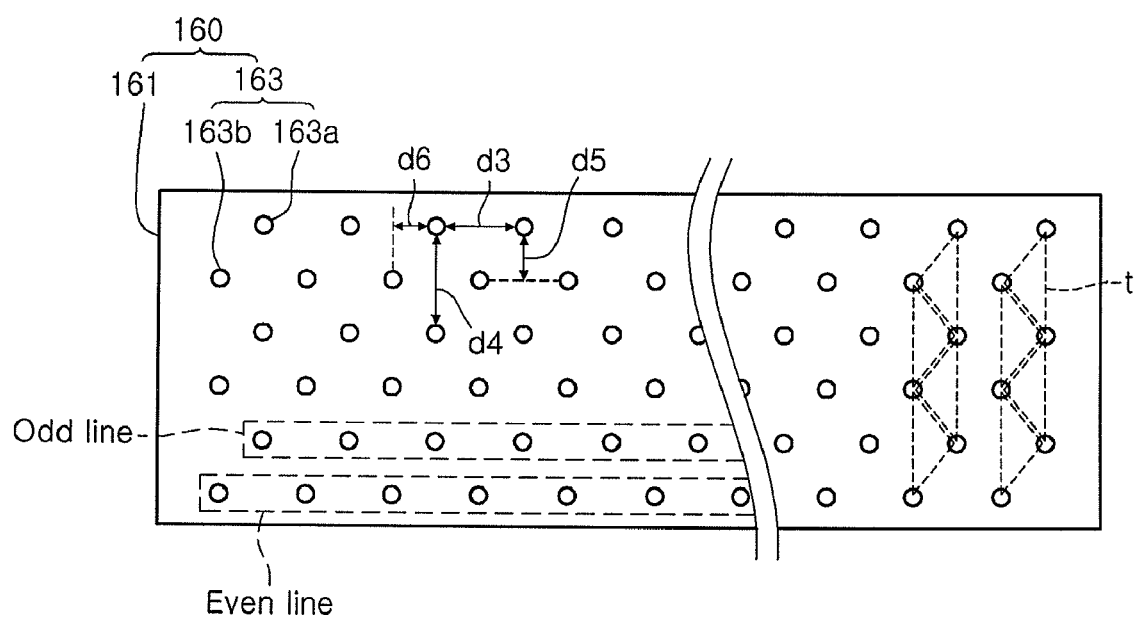
FIG. 6 is a plane view showing the portion of a light source unit disposed below the diffusion plate according to an embodiment of the present disclosure.

FIG. 6 is a planar view showing a portion of a light source unit disposed below a diffusion plate according to an embodiment of the present disclosure. As shown in FIG. 6, the light source unit 160 of the present embodiment includes plural LEDs 163 of triangular arrangement "t" loaded on a PCB 161.

The plural LEDs 163 include a plurality of odd-numbered line LEDs 163a and a plurality of even-numbered line LEDs 163b. The plural odd-numbered line LEDs 163a and the plural even-numbered line LEDs 163b are arranged in a zig-zag shape opposite each other. In other words, two adjacent LEDs in odd-numbered lines constitute a parallelogram with corresponding two adjacent LEDs in even-numbered lines. The plural odd-numbered line LEDs 163a are arranged at fixed intervals. Similarly, the plural even-numbered line LEDs 163b are also arranged at fixed intervals.

More specifically, the distance d3 between the adjacent odd-numbered line LEDs 163a of the same line is below about 34 mm. The distance between the adjacent even-numbered LEDs 163b of the same line is equal to the distance d3 between the odd-numbered LEDs 163a. The distance d4 between the adjacent odd-numbered line LEDs 163a of different lines is below about 40 mm. The distance between the adjacent different even-numbered line LEDs 163b of different lines is equal to the distance d4 between the different odd-numbered line LEDs 163a adjacent to each other. The distance d5 from the odd-numbered line LED 163a to a position between the adjacent even-numbered line LEDs 163b opposite to it is below about 20 mm. The distance d6 from the odd-numbered line LED 163a to a position between it and the adjacent odd-numbered line LED 163a opposite to the adjacent even-numbered line LED 163b is below about 17 mm.

In this manner, the arrangement configuration of the LEDs 163 can be optimally designed to implement the desired slimness of the backlight unit and the LCD device. The optimized LED arrangement configuration together with the diffusion plate (150 in FIG. 4 or 250 in FIG. 5) makes it more possible to implement the desired slimness of the backlight unit and the LCD device and prevents the stain phenomenon.

More specifically, in order to prevent the stain defects from being caused by the LEDs 163, the diffusion plates 150 and 250 according to two embodiments as described above can include dispersing particles (not shown), such as Si beads, which are about 2 μm in semi-diameter. The amount of these is about 2-3 times greater than that of the related art diffusion plate. The dispersing particles contained in the diffusion plates 150 or 250 primarily make the brightness distribution of the LEDs 163 uniform. Also, the diffusion plate 150 or 250 forces the inversed pyramid patterns 151 or 251 on its upper surface to secondarily equalize the previously equalized brightness distribution. This results from the fact that the inversed pyramid patterns 151 or 251 reproduce (or realize) images of the LEDs in pitch spaces between the LEDs 163 according to the direction they face and their arrangement.

Although it is not explained in detail referring to the drawings, the dispersing particles contained into the diffusion plates 150 or 250 can be quantitatively controlled in order to remove the diffusion sheet disposed on the diffusion plates 150 or 250. In this case, the backlight unit and the LCD device can be even more thinly produced.

A plurality of diffusion sheets (not shown) can also be stacked on the diffusion plates 150 or 250. The plural diffusion sheets thirdly equalize the brightness distribution. In addition, a plurality of prism sheets (not shown) can be stacked on the diffusion sheets. The prism sheets fourthly equalize the brightness distribution into a more uniform state. This results from the fact that the prism sheets again reproduce the reproduced images of the LEDs 163 in the pitch spaces between the LEDs 163. Consequently, the double LED image reproduction minimizes the brightness difference between the regions in which the LEDs are positioned and those where they are not.

As described above, the LCD device according to the embodiment of the present disclosure includes the diffusion plates 150 or 250 in which the inversed pyramid patterns 151 or 251 are formed in an intaglio structure. These pyramid patterns are then arranged along a diagonal direction in the center of one side portion of the diffusion plate 150 or 250. Therefore, the LCD device can prevent the stain defects from being caused by the LEDs.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

The invention claimed is:

1. A backlight unit comprising:
a plurality of LEDs arranged at fixed intervals;
a reflection sheet disposed under the LEDs and configured to reflect light;
a diffusion plate disposed on the LEDs and configured to diffuse light; and
a plurality of inversed pyramid patterns formed in intaglio on the upper surface of the diffusion plate, wherein one edge portion of the inversed pyramid patterns is inclined with respect to a side surface of the diffusion plate, wherein one edge portion of the inversed pyramid patterns is arranged along the boundary between the upper surface of the diffusion plate and side surfaces of the inversed pyramid patterns,
wherein the plurality of LEDs include a plurality of odd-numbered line LEDs and a plurality of even-numbered line LEDs, and two adjacent LEDs in odd-numbered lines constitute a parallelogram with corresponding two adjacent LEDs in even-numbered lines.

2. The backlight unit according to claim 1, wherein one side portion of inversed pyramid pattern is inclined at an angle of about 45° with respect to the side surface of the diffusion plate.

3. The backlight unit according to claim 1, wherein the diffusion plate comprises a mixture which contains one resin material of Cyclo Olefin Polymer and Cyclo Olefin Co-polymer and dispersing particles.

4. The backlight unit according to claim 1, wherein a bottom portion of the inversed pyramid pattern is cut to be formed in a planar structure, and wherein the bottom portion is opposite to the upper surface of the diffusion plate.

5. The backlight unit according to claim 1, wherein a width of the top portion of the inversed pyramid pattern is in a range of about 50 to 100 μm, and the top portion is on the upper surface of the diffusion plate.

6. The backlight unit according to claim 1, wherein an intaglio depth of the inversed pyramid pattern is in a range of about 20 to 50 μm.

7. The backlight unit according to claim 1, wherein a pitch between centers of two adjacent inversed pyramid patterns is in a range of about 50 to 100 μm.

8. The backlight unit according to claim 1, wherein a distance between the inversed pyramid patterns adjacent to each other is below 10 μm.

9. The backlight unit according to claim 1, wherein the diffusion plate is in a thickness range of about 1 to 2 mm.

10. The backlight unit according to claim 1, wherein a distance between a rear surface of the diffusion plate and a upper surface of the reflection sheet is in a range of about 3 to 8 mm.

11. The backlight unit according to claim 1, wherein a distance between the adjacent odd-numbered line LEDs of the same line is below about 34 mm.

12. The backlight unit according to claim 1, wherein a distance between the adjacent even-numbered line LEDs of the same line is below about 34 mm.

13. The backlight unit according to claim 1, wherein a distance between the adjacent odd-numbered line LEDs on different lines is below about 40 mm.

14. The backlight unit according to claim 1, wherein a distance between the adjacent even-numbered line LEDs on different lines is below about 40 mm.

* * * * *